United States Patent
Kameyama et al.

(10) Patent No.: US 9,884,931 B2
(45) Date of Patent: Feb. 6, 2018

(54) VINYLIDENE CHLORIDE COPOLYMER LATEX AND FILM FOR BLISTER PACK

(71) Applicant: ASAHI KASEI CHEMICALS CORPORATION, Tokyo (JP)

(72) Inventors: Koichi Kameyama, Tokyo (JP); Yoko Tanaka, Tokyo (JP); Mitsuyuki Furukawa, Tokyo (JP); Yosuke Yagi, Tokyo (JP); Eiichi Kawasaki, Tokyo (JP)

(73) Assignee: ASAHI KASEI CHEMICALS CORPORATION, Tokyo (JP)

( * ) Notice: Subject to any disclaimer, the term of this patent is extended or adjusted under 35 U.S.C. 154(b) by 574 days.

(21) Appl. No.: 14/380,283

(22) PCT Filed: Feb. 22, 2013

(86) PCT No.: PCT/JP2013/054585
§ 371 (c)(1),
(2) Date: Aug. 21, 2014

(87) PCT Pub. No.: WO2013/125699
PCT Pub. Date: Aug. 29, 2013

(65) Prior Publication Data
US 2015/0044489 A1 Feb. 12, 2015

(30) Foreign Application Priority Data
Feb. 23, 2012 (JP) ................................. 2012-037041

(51) Int. Cl.
| C08F 2/24 | (2006.01) |
| C08F 2/26 | (2006.01) |
| C09D 127/08 | (2006.01) |
| B65D 75/36 | (2006.01) |
| C08F 214/08 | (2006.01) |
| A61J 1/03 | (2006.01) |

(52) U.S. Cl.
CPC .............. *C08F 214/08* (2013.01); *A61J 1/035* (2013.01); *B65D 75/36* (2013.01); *C08F 2/24* (2013.01); *C08F 2/26* (2013.01); *C09D 127/08* (2013.01); *Y10T 428/31801* (2015.04); *Y10T 428/31935* (2015.04)

(58) Field of Classification Search
None
See application file for complete search history.

(56) References Cited

U.S. PATENT DOCUMENTS

| 3,696,067 A * | 10/1972 | Trofimow ............... C08F 14/08 524/827 |
| 3,850,726 A * | 11/1974 | Smith ................... C08F 214/08 156/182 |
| 6,730,726 B1 | 5/2004 | Vanderveken et al. |
| 2002/0197425 A1* | 12/2002 | Wolf .................. B29C 47/0021 428/35.2 |
| 2004/0121127 A1* | 6/2004 | Jokela ..................... B32B 27/10 428/178 |
| 2007/0137789 A1* | 6/2007 | Jokela ..................... B32B 27/10 156/325 |

FOREIGN PATENT DOCUMENTS

| EP | 2 738 217 A1 | 6/2014 |
| GB | 1011500 | 12/1965 |
| GB | 1 281 016 | 7/1972 |
| JP | 63-291668 A | 11/1988 |
| JP | 1-266117 A | 10/1989 |
| JP | 8-239536 A | 10/1989 |
| JP | 4-96980 A | 3/1992 |
| JP | 2001-526315 A | 12/2001 |
| JP | 2005-60580 A | 3/2005 |
| JP | 3931994 B2 | 6/2007 |

OTHER PUBLICATIONS

European Search Report dated Jan. 5, 2015, in European Patent Application No. 13751649.8.
International Preliminary Report on Patentability, and Translation of Written Opinion of the International Searching Authority, dated Aug. 26, 2014, for International Application No. PCT/JP2013/054585 (Forms PCT/IB/373 and PCT/ISA/237).
International Search Report dated May 28, 2013 for International Application No. PCT/JP2013/054585 (Form PCT/ISA/210).

* cited by examiner

*Primary Examiner* — Sheeba Ahmed
(74) *Attorney, Agent, or Firm* — Birch, Stewart, Kolasch & Birch, LLP

(57) ABSTRACT

Provided is a film for blister packs having barrier capability that is excellent in terms of impact resistance and thermal stability. Also provided is a vinylidene chloride polymer-containing latex that is ideal for producing the film. The coating layer of the film for a blister pack, and the latex, comprise a vinylidene chloride copolymer having a weight-average molecular weight, Mw, between 120,000 and 300,000 that is obtainable by emulsion polymerizing 70 to 95 parts by mass of vinylidene chloride and 30 to 5 parts by mass of one or more other monomer(s) copolymerizable with the vinylidene chloride, with the proviso that the total amount of vinylidene chloride and the other monomer(s) is 100 parts by mass).

17 Claims, No Drawings

VINYLIDENE CHLORIDE COPOLYMER LATEX AND FILM FOR BLISTER PACK

TECHNICAL FIELD

The present invention relates to a film for blister packs and a vinylidene chloride copolymer latex suitable therefor.

BACKGROUND ART

Plastic films coated with a vinylidene chloride copolymer latex have a characteristic of excellent barrier properties, and are used mainly for food packaging materials and medicament packaging materials in order to block oxygen and water vapor and to store the packaged food and medicaments without being moistened or oxidized for a long period. Of various films, some have excellent barrier properties against either oxygen or water vapor, but there are few films that can block both oxygen and water vapor at a high level except films employing a vinylidene chloride copolymer. Thus, in general, packaging materials coated with a vinylidene chloride copolymer latex are widely used.

Particularly, in blister pack applications represented by medicine packaging, vinylidene chloride copolymer latexes are universally used (for example, see Patent Literatures 1 to 3.)

In recent years, the high level of barrier properties has been required for films for blister packs. Accordingly, performance requirements for the barrier properties of vinylidene chloride copolymer latexes have been enhanced. The barrier properties of coated films generally depend on the thickness of a coating of a vinylidene chloride copolymer latex. The larger the thickness of the coating is, the higher the barrier properties that can be exerted is. However, when a large amount of the vinylidene chloride copolymer latex is coated at a time in order to increase the thickness of the coating of the latex, there occur problems of causing cracks and crinkles in the coating during the drying process. If such a poor appearance takes place in the coating, appearances as commercial products are impaired, and moreover, the film will not be able to exert the expected barrier properties.

Thus, for the purpose of improving the barrier properties per unit thickness of a vinylidene chloride copolymer coating, the types and ratio of the constituent units derived from other monomer(s) constituting the copolymer with vinylidene chloride i.e., the composition of the copolymer, also can be changed for the use. However, when the composition of the copolymer is changed, the problem of a poor discoloration resistance to light and heat easily arises, easily resulting in the problem of deterioration in the appearances as commercial products.

Also, one of the performance requirements for films for blister packs includes impact resistance. Films for blister packs have to exert flexibility against impact forces from the outside (an impact resistance) to thereby maintain the structure of the coating and the barrier properties. Films coated with a vinylidene chloride copolymer latex have to exert an impact resistance immediately after being coated, and to sustain the impact resistance for a long period. For example, in the case where the impact resistance is insufficient in the early stage of coating, cracks and defects may be caused by an impact force applied during slitting or shaping of the film. These cracks and defects may lead to a defective condition where the barrier properties are impaired. Also, in the case where films are stored for a long period, crystallization, which is characteristic of vinylidene chloride copolymers, progresses, and the coating easily becomes brittle. Therefore, due to the insufficient impact resistance, cracks and defects arise, and the problem that the barrier properties are impaired may take place.

Generally, in order to enhance the barrier properties, the proportion of the constituent units derived from vinylidene chloride in a vinylidene chloride copolymer is adjusted to thereby adjust the barrier properties. In the case where the barrier properties are enhanced only by adjusting the proportion, the coating becomes brittle and tends to lack an impact resistance because the crystallinity of the vinylidene chloride copolymer becomes increased. Thus, if this coating is used as a film for blister packs, cracks and defects are easily generated, and the expected barrier properties cannot be exerted. Also, in the case where a wax composition is added to a vinylidene chloride copolymer latex, the coating tends to rapidly become brittle after the coating and to have a drastically reduced impact resistance. Therefore, if this is used as it is as a film for blister packs, defects take place in the film, and thus, the expected barrier properties cannot be exerted.

CITATION LIST

Patent Literature

Patent Literature 1: JP 2005-60580 A
Patent Literature 2: JP 2001-526315 A
Patent Literature 3: JP S63-291668 A

SUMMARY OF INVENTION

Technical Problem

An object of the present invention is to provide a film for blister packs that has an excellent impact resistance and heat stability as well as barrier properties, and a latex containing a vinylidene chloride copolymer suitable for producing the same.

Solution to Problem

The present inventors, as the result of intensive studies to solve the problem, have found that, regarding to a vinylidene chloride copolymer latex, wherein the proportion of the constituent units derived from vinylidene chloride in the copolymer constituting the latex and the molecular weight of the copolymer are adjusted in an optimal range, a film for blister packs on which this latex has been coated maintains the impact resistance in a high level immediately after coating for a long period, and that thus such a film has no cracks causing during slitting and shaping and has excellent heat stability and barrier properties, completing the present invention. That is, the present invention is as follows.

(1) A latex comprising a vinylidene chloride copolymer obtainable by emulsion polymerizing 70 to 95 parts by mass of vinylidene chloride with 30 to 5 parts by mass of one or more other monomer(s) copolymerizable with vinylidene chloride, with the proviso that the total of vinylidene chloride and the other monomer(s) is 100 parts by mass, characterized in that the weight average molecular weight of the copolymer, Mw. is from 120,000 to 300,000.

(2) The latex according to (1), wherein the copolymer is particulate and the average particle size thereof is from 140 to 190 nm.

(3) The latex according to (1) or (2), wherein the latex has a surface tension of from 45 to 55 mN/m.
(4) The latex according to any one of (1) to (3), wherein the copolymer is a vinylidene chloride copolymer obtainable by emulsion polymerizing 89 to 92 parts by mass of vinylidene chloride with 11 to 8 parts by mass of one or more other monomer(s) copolymerizable with vinylidene chloride.
(5) The latex according to any one of claims (1) to (4), wherein the weight average molecular weight of the copolymer is from 120,000 to 190,000.
(6) A film for blister packs comprising a substrate and a coating layer,
wherein the coating layer comprises a vinylidene chloride copolymer comprising 70 to 95 parts by mass of constituent units derived from vinylidene chloride and 30 to 5 parts by mass of constituent units derived from one or more other monomer(s) copolymerizable with vinylidene chloride, with the proviso that the total of the constituent units derived from vinylidene chloride and the constituent units derived from the other monomer(s) is 100 parts by mass, and having a weight average molecular weight, Mw, of from 120,000 to 300,000.
(7) The film for blister packs according to (6), wherein the copolymer is a vinylidene chloride copolymer comprising 89 to 92 parts by mass of the constituent units derived from vinylidene chloride and 11 to 8 parts by mass of the constituent units derived from one or more other monomer(s) copolymerizable with vinylidene chloride.
(8) The film for blister packs according to (6) or (7), wherein the weight average molecular weight, Mw, of the copolymer is from 120,000 to 190,000.
(9) The film for blister packs according to any one of (6) to (8), having a tensile impact strength of 200 kJ/m² or more.
(10) The film for blister packs according to any one of (6) to (9), wherein the coating layer comprises from 0.01 to 1 part by mass of a wax based on 100 parts by mass of the copolymer.
(11) The film for blister packs according to any one of (6) to (9), wherein the coating layer comprises a plurality of layers and one or more of the plurality of layers is/are layer(s) comprising no wax.
(12) The film for blister packs according to (11), wherein the outermost layer of the plurality of layers comprises from 0.01 to 1 part by mass of a wax.

Advantageous Effects of Invention

According to the present invention, it is possible to provide a film for blister packs that exerts a high impact resistance immediately after coating for a long period and high barrier properties immediately after use for a long period, and has excellent heat stability, and a latex containing a vinylidene chloride copolymer suitable for the same.

DESCRIPTION OF EMBODIMENTS

<Vinylidene Chloride Copolymer Latex>

The latex of the present invention contains a vinylidene chloride copolymer obtainable by emulsion polymerizing 70 to 95 parts by mass of vinylidene chloride with 30 to 5 parts by mass of one or more other monomer(s) copolymerizable with vinylidene chloride (the total of vinylidene chloride and the other monomer(s) is 100 parts by mass.), wherein the weight average molecular weight Mw of the copolymer is from 120,000 to 300,000.

The vinylidene chloride copolymer used for the present invention has constituent unites derived from vinylidene chloride and constituent unites derived from one or more other monomer(s) copolymerizable with vinylidene chloride, and the content of the constituent units derived from vinylidene chloride in the copolymer is 70 to 95 parts by mass (the total of the constituent units derived from vinylidene chloride and the constituent units derived from the other monomer(s) is 100 parts by mass). The content of the constituent units derived from vinylidene chloride is preferably in the range from 88 to 93 parts by mass, and more preferably from 89 to 92 parts by mass. In the case where the ratio of the constituent units derived from vinylidene chloride is 95 parts by mass or less, a condition of the coating sufficient to develop barrier properties can be achieved. In the case where the ratio of the constituent units derived from vinylidene chloride is 70 parts by mass or more, good barrier properties are developed.

As other monomers copolymerizable with vinylidene chloride, any monomers can be used as long as they can be copolymerized with vinylidene chloride. The preferable examples include vinyl chloride, acrylic acid esters, such as methyl acrylate, ethyl acrylate, butyl acrylate, 2-ethylhexyl acrylate, and 2-hydroxyethyl acrylate, methacrylic acid esters, such as methyl methacrylate and glycidyl methacrylate, acrylonitrile, methacrylonitrile, and unsaturated carboxylic acids, such as acrylic acid, methacrylic acid, itaconic acid, and maleic acid. One or two or more of these can be selected and used. More preferred are acrylic acid and/or esters thereof.

In a vinylidene chloride copolymer constituting the latex of the present invention, the content of constituent unites derived from one or more other monomer(s) copolymerizable with vinylidene chloride is from 30 to 5 parts by mass (the total of the constituent units derived from vinylidene chloride and the constituent units derived from the other monomer(s) is 100 parts by mass.), preferably from 12 to 7 parts by mass, and more preferably 11 to 8 parts by mass. In the case where the ratio of the other monomer(s) copolymerizable with vinylidene chloride is 30 parts by mass or less, the barrier properties of the coating formed when the latex is coated and the properties from the other monomer(s) can be balanced. In the case of 5 parts by mass or more, due to lower crystallinity of the coating, flexibility can be imparted to the coating.

In the present invention, for example, with a polymerization method in which monomers are continuously added while adjusting the rate at which the monomers are added during latex emulsion polymerization, a vinylidene chloride copolymer latex can be obtained, wherein the proportion of the constituent units derived from vinylidene chloride in the copolymer constituting the latex and the molecular weight of the copolymer are adjusted in a specific range.

Emulsion polymerization for vinylidene chloride copolymer of the present invention is carried out at a temperature from 30 to 70° C. The polymerization temperature is preferably in a range from 40 to 60° C. In the case where the polymerization temperature is 70° C. or less, the heat stability is good because degradation of the raw materials in the course of polymerization is suppressed. In the case where the polymerization temperature is 30° C. or more, the polymerization rate can be increased, and the polymerization becomes more efficient. Although, for example, water or methanol can be used as a polymerization medium, preferably, only water is used.

The predetermined amounts of vinylidene chloride and other monomer(s) copolymerizable with vinylidene chloride used in emulsion polymerization for the vinylidene chloride copolymer of the present invention can be mixed, for example, before polymerization, and be continuously charged while adjusting the addition rate. The addition rate of the monomers to be continuously charged is, for example, in the case of a polymerization temperature of 50° C., preferably to the extent that 70% or more of the total weight of the monomers to be added is added over from 17 to 30 hours, preferably from 19 to 30 hours, and more preferably 21 to 30 hours. The time for continuous addition is preferably optimized depending on the polymerization temperature. A preferred method is the one in which monomers not continuously charged are batch-wise charged in the initial stage of polymerization, and the balance is continuously added afterward. In the case where monomers are continuously charged under the conditions of the present invention, the degree of polymerization of the copolymer can be adjusted. Particularly, of the physical properties of a latex, the weight average molecular weight of the copolymer can be adjusted to an optimal range to thereby carry out polymerization efficiently.

Examples of surfactants that can be used in emulsion polymerization for the vinylidene chloride copolymer latex of the present invention include anionic surfactants, such as alkyl sulfates, alkyl benzenesulfonates, alkyl sulfosuccinates, alkyl diphenylether disulfonates, and alkyl sulfonates. Examples of polymerization initiators include persulfates, such as sodium persulfate and potassium persulfate, and peroxides, such as hydrogen peroxide, t-butyl hydroperoxide, and cumene hydroperoxide. Examples of polymerization activators include those that accelerate radical decomposition of the initiators, such as sodium hydrogen sulfite. Types of these polymerization additives are not particularly limited, and, for example, those conventionally and preferably used in the art can be used. These substances may remain in the coating formed from the latex to be a cause of decreases in the barrier properties, and thus the amount of the substances to be used is preferably as small as possible.

For example, a portion of the monomers subjected to polymerization can be continuously added at an adjusted rate and polymerized to thereby adjust the degree of polymerization of vinylidene chloride copolymer constituting the latex of the present invention within the optimal range. The measure of the degree of polymerization is determined with the weight average molecular weight Mw and the number average molecule weight Mn based on polystyrene measured by gel permeation chromatography. The weight average molecular weight Mw of the vinylidene chloride copolymer constituting the latex of the present invention is from 120,000 to 300,000, preferably 120,000≤Mw≤220,000, and more preferably 120,000≤Mw≤190,000. If Mw is 120,000 or more, the heat stability is excellent because the stability of the vinylidene chloride copolymer against heat and light is excellent. If Mw is 300,000 or less, the impact resistance of the coating is high in the early stage of coating and the impact resistance is enhanced in a short period because the crystallization of the vinylidene chloride copolymer proceeds rapidly.

The ratio of the weight average molecular weight Mw to the number average molecule weight Mn (Mw/Mn) is preferably 3.0 or less. If Mw/Mn is 3.0 or less, the impact resistance of the coating is high in the early stage of coating, the impact resistance is enhanced in a short period, and the high impact resistance can be maintained for a long period.

The average particle size of vinylidene chloride copolymer particles in the vinylidene chloride copolymer latex of the present invention is preferably from 140 to 190 nm and more preferably from 150 to 180 nm. If the average particle size is 140 nm or more, the surface area of the particles in the coating is relatively reduced, and the surfactant remaining among the particles is reduced. Accordingly, molecular diffusion easily proceeds after fusion of the particles, the film forming ability is enhanced, and the mechanical physical properties of the coating rise more rapidly. Also, the film surface after coating easily becomes smooth, providing an excellent appearance. Examples of the method for adjusting the average particle size include, but not particularly limited to, methods, such as adjustment of the amount of the surfactant to be used at the start of polymerization, adjustment of polymerization time, and use of seed crystals.

The surface tension of the vinylidene chloride copolymer latex of the present invention is preferably from 45 to 55 mN/m and more preferably from 45 to 52 mN/m. If the surface tension is in this range, the latex is uniformly applied to the substrate surface or the surface of the adhesive (anchor coat) layer on the substrate. Since a coating is tightly formed, defects on the boundary surface are difficult to generate, and the stable impact resistance and barrier properties are exerted. Examples of the method to adjust the surface tension include a method for adjusting the amount of the surfactant to be used during polymerization and a method for adjusting the composition of the monomers to be used for polymerization. Also, surfactants can be used after polymerization, and types of the surfactants are not particularly limited. However, since addition of surfactants influences the physical properties of the coating, such as the barrier properties and flexibility, the surface tension is preferably adjusted with polymerization conditions.

The solid content of the vinylidene chloride copolymer latex of the present invention is preferably from 40 to 70% by mass and more preferably from 48 to 62% by mass. The pH of the vinylidene chloride copolymer latex can be preferably adjusted with addition of a basic adjusting agent commonly used so as to reach from 2.0 to 6.0 after polymerization. Although types of the basic adjusting agent are not particularly limited, aqueous ammonia, tertiary amines, metal salts of weak acids, and the like are usually employed.

The vinylidene chloride copolymer latex may be employed after being subjected to emulsion polymerization followed by dialysis treatment to remove the substance that is the possible cause of decreases in the barrier properties as much as possible.

<Film for Blister Packs>

The film for blister packs of the present invention is composed of a substrate and coating layer. The content of the constituent unites in the vinylidene chloride copolymer contained in the coating layer is 70 to 95 parts by mass of the constituent unites derived from vinylidene chloride and 30 to 5 parts by mass of the constituent unites derived from one or more other monomer(s) copolymerizable with vinylidene chloride (the total of the constituent unites derived from vinylidene chloride and the constituent unites derived from the other monomer(s) is 100 parts by mass). The weight average molecular weight Mw is from 120,000 to 300,000.

The copolymer is preferably a vinylidene chloride copolymer composed of 88 to 93 parts by mass of the constituent unites derived from vinylidene chloride and 12 to 7 parts by mass of the constituent unites derived from one or more other monomer(s) copolymerizable with vinylidene chloride, and more preferably is a vinylidene chloride copolymer composed of 89 to 92 parts by mass of the constituent unites derived from vinylidene chloride and 11 to 8 parts by mass of the constituent unites derived from one or more other monomer(s) copolymerizable with vinylidene chloride. If the content of the constituent unites derived from vinylidene chloride is 70 parts by mass or more and the content of the constituent unites derived from one or more other monomer(s) copolymerizable with vinylidene chloride is 30 parts by mass or less in the copolymer, a film having good barrier properties can be obtained. Also, if the content of the constituent unites derived from vinylidene chloride is 95 parts by mass or less and the content of the constituent unites derived from one or more other monomer(s) copolymerizable with vinylidene chloride is 5 parts by mass or more in the copolymer, a film having excellent barrier properties and a good flexibility can be obtained.

The weight average molecular weight Mw of the copolymer is preferably in the range of 120,000≤Mw≤300,000 and more preferably of 120,000≤Mw≤190,000. If Mw is 120,000 or more, the discoloration resistance is excellent because the stability of the film against heat and light is excellent. If Mw is 300,000 or less, the impact resistance of the film is high in the early stage of coating and the impact resistance is enhanced in a short period.

The tensile impact strength of the blister packs of the present invention can be preferably maintained at 200 kJ/m$^2$ or more.

If the tensile impact strength is 200 kJ/m$^2$ or more, cracks and defects are difficult to occur during film processing, and the expected barrier properties can be exerted. Also, although there is no upper limit on this tensile impact strength, strength of 200 kJ/m$^2$ or more has no significant difference in practice. It should be noted that the tensile impact strength of the present invention is tensile impact strength to be measured at 20° C. in accordance with JIS-K7160. In order to achieve tensile impact strength of 200 kJ/m$^2$, it is effective that, for example, the composition of the latex contained in the coating layer is set as described above, as well as the average particle size of the copolymer in the latex is set to from 140 to 190 m and the surface tension of the latex is set to from 45 to 55 mN/m.

The oxygen permeability and water vapor permeability of the film for blister packs of the present invention can be adjusted by changing, for example, the content of the constituent unites derived from vinylidene chloride and the content of one or more other monomer(s) copolymerizable with vinylidene chloride in the vinylidene chloride copolymer contained in the coating layer, and the molecular weight of the copolymer.

The oxygen permeability of the film for blister packs of the present invention is preferably 1.2 cm$^3$/m$^2$/day or less under a condition of 23° C. and an air pressure of 0.1 MPa, for example, in the case of a film in which the coat layer is formed on a 250 μm film made of polyvinyl chloride so that the coating layer is 40 g/m$^2$.

The water vapor permeability of the film for blister packs of the present invention is preferably 1.2 g/m$^2$/day or less under a condition of 38° C. and a humidity of 100%, for example, in the case of a film in which the coating layer is formed on a 250 μm film made of polyvinyl chloride so that the coating layer is 40 g/m$^2$.

Although the substrates constituting the film for blister packs of the present invention are not particularly limited, typical examples include films of polyvinyl chloride, polyesters, polyamides, and polypropylenes, and films made of polyvinyl chloride are generally used. The thickness of the substrate is normally from 8 to 300 μm, although it depends on the materials to be used.

The thickness of the coating layer that contains the vinylidene chloride copolymer constituting the film for blister packs of the present invention is normally from 3 to 100 μm, preferably from 5 to 80 μm, and more preferably 10 to 50 μm. With 3 μm or more, the barrier performance is sufficient as a film; with 100 μm or less, the productivity during coating is good.

The coating layer constituting the film for blister packs of the present invention contains a layer formed by coating a vinylidene chloride copolymer latex thereon, but is not limited to being singly composed of the vinylidene chloride copolymer. It is also possible to use a layer of a functionally-adjusted copolymer predominantly based on monomers having high polymerization activity other than vinylidene chloride, in combination with the vinylidene chloride copolymer.

The vinylidene chloride copolymer latex to be coated in order to form a coating layer constituting the film for blister packs of the present invention is preferably a vinylidene chloride copolymer latex in which the proportion of the constituent unites derived from vinylidene chloride in the copolymer constituting the latex and the molecular weight of the copolymer are adjusted in a specific range, with a polymerization method in which monomers are continuously added while adjusting the rate at which the monomers are added during latex emulsion polymerization. However, vinylidene chloride copolymer latexes that do not meet the requirements set forth in the present invention may be used in combination. In this case, to exert the physical properties of a film obtained from the vinylidene chloride copolymer latexes of the present invention, a vinylidene chloride copolymer latex that satisfies the requirements set forth in the present invention and a vinylidene chloride copolymer latex deviated that does not meet the requirements set forth in the present invention are each separately coated to thereby form separated coating layers.

In the case where a latex is coated on a substrate constituting the film for blister packs of the present invention, a coating layer can be formed by coating the latex directly on the substrate. However, in order to enhance the adhesion between the substrate and the coating layer, the substrate surface is preferably activated in advance before coating. A method for activating the substrate surface, such as corona-discharge treatment, plasma discharge treatment, strong acid liquid treatment, electron beam treatment, ultraviolet treatment, and flame treatment can be applied to thereby introduce a hydrophilic component, such as hydroxyl groups, carbonyl groups, ester groups, carboxylic group, ether bonds, amino groups, imino groups, amide groups, sulfate groups, and amide groups onto the substrate surface.

In the present invention, as a method for further enhancing the adhesive between the substrate and the coating layer, an anchor coat agent is coated on the substrate surface and dried to form an adhesive layer, and then, a latex can be coated thereon. Examples of the anchor coat agent to be coated on the substrate surface include anchor coat agents containing one or more selected from polyacrylic resins, polyurethane resins, isocyanate resins, polyester resins, oxazoline resins, and carbodiimide resins. An anchor coat agents selected from polyacrylic acid resins, polyurethane resins, and isocyanate resins can be preferably used to form an anchor coating layer. Forms of the anchor coat agent is not particularly limited, and may be any of solution forms including organic solvents, aqueous solution forms, and aqueous emulsion forms. For application of anchor coat agents, common methods carried out in the field of film coating can be used. For example, any of methods, such as gravure methods, such as direct gravure and reverse gravure methods, roll coating methods, bar coating methods, and coating methods using doctor knife methods and air knife methods can be used. After application, drying treatment can be carried out with the known methods, such as heat drying, such as hot-air drying at a temperature of about 40 to about 180° C., and hot-roll drying, and infrared drying. The thickness of the anchor coating layer is preferably from 0.1 to 2 µm in order to maintain the surface smoothness and the adhesion between the substrate and the coating layer. In order to enhance the adhesive with the substrate, preferably after the aforementioned activation of the substrate surface, formation of an anchor coating layer is carried out, and then, a latex is preferably coated.

As the method for coating a latex on the substrate of the present invention to form a coating layer, the common methods carried out in the field of film coating can be used. Although, as the coating method, gravure methods, such as direct gravure and reverse gravure methods, roll coating methods, such as two-roll beat coat and bottom-feed three-roll reverse coat methods, doctor knife methods, air knife methods, die coat methods, bar coating methods, dipping methods, and spray coat methods can be applied. In the viewpoint that the productivity is good and coating layers can be formed easily, the gravure methods, roll coating methods, and air knife methods are preferably adopted, and the gravure methods are more preferably adopted. The amount of the latex to be applied during coating depends on the desired thickness of the coating layer, and is not particularly limited. One or more rounds of coating and drying can be repeated to form the desired coating layer. However, if an amount of application with which drying will not be insufficient and the solvent will not reside is set, the physical properties of the film of the present invention can be effectively exerted. Also, examples of the drying method include, but not particularly limited to, natural drying methods, methods of drying in an oven set at a predetermined temperature, and methods of using the drying device provided with the coater, for example arch dryers, floating dryers, drum dryers, and infrared dryers. Additionally, drying conditions can be selected as appropriate depending on a drying method, but, for example, in case of the method of drying in an oven, drying is preferably carried out at a temperature of from 60 to 200° C. for from about one second to about five minutes.

A film coated with the latex of the present invention may be submitted to an aging treatment at room temperature or higher temperatures. In case where the film is submitted to an aging treatment, the physical properties of the film are promoted to be developed, and stabilization of the gas barrier properties and adhesion of the substrate film and the coating layer can be enhanced. However, if aging is carried out at a temperature of 25° C. or more, no effects are observed even if an aging treatment is carried out for a period longer than required. Thus, the temperature and period of the aging treatment is desirably adjusted in accordance with development of the physical properties.

A coating layer constituting the film for blister packs of the present invention can contain from 0.01 to 1 part by mass of a wax based on 100 parts by mass of vinylidene chloride copolymer. One wax may be contained, or a wax composition composed of two or more waxes may be contained. In the case where a wax (or a wax composition) is contained, 0.01 to 1 part by mass of the wax can be added to a latex before a coating layer is formed, based on 100 parts by mass of the vinylidene chloride copolymer in the latex. If the amount of wax added is 1 part by mass or less, the slidability of the film after coating can be enhanced and thereby blocking of the film can be prevented. Also, if the amount is 0.01 parts by mass or more, the film can exert slidability effects. Types of the wax that may be used in the present invention are not particularly limited, and natural or synthesis waxes can be used. For example, polyolefin waxes, paraffin waxes, carnauba wax, bee wax, Chinese wax, ozocerite and montan wax, and esterified substances thereof can be preferably used singly or as a composition containing the same as the main components. Of these, polyolefin waxes are preferably used. In the case where a wax is added to the vinylidene chloride copolymer, the initial physical properties are varied because crystallization easily proceeds, and thus, the amount of the wax is preferably adjusted depending on the form of the coating layer in the film.

Also, a film for blister packs can be constituted by constituting a coating layer with a plurality of layers, in one or more of which a layer containing a vinylidene chloride copolymer that satisfies the requirements set forth in the present invention is used. In the case where a film is constituted by coating a layer containing a vinylidene chloride copolymer that satisfies the requirements set forth in the present invention on the layers other than the surface layer, a wax is not preferably added to the latex before the layer is formed such that the layer will be a layer containing no wax. In the case where no wax is contained, impact resistance and flexibility are excellent because curing of the coating moderately progresses. Thus, defects and cracks become difficult to occur when the film is processed after coating.

In the case where a layer containing a vinylidene chloride copolymer that satisfies the requirements set forth in the present invention is coated as the surface layer to thereby constitute a film, 0.01 to 1 part by mass of a wax is preferably added to the latex based on 100 parts by mass of the vinylidene chloride copolymer before the layer is formed, and the latex is coated to thereby form a coating layer. If the amount of wax added is 1 part by mass or less, the slidability of the film after coating can be enhanced and thereby blocking of the film can be prevented. Also, if the amount is 0.01 parts by mass or more, the film can exert slidability effects. In the case where a wax is added to the surface layer, a layer to which no wax is added is provided preferably as another layer constituting the coating layer.

When a coating layer is formed with the vinylidene chloride copolymer latex of the present invention and used as a film for blister packs, another coating layer of a vinylidene chloride copolymer latex having barrier properties than the coating layer according to the present invention may be combined to constitute the film.

In the film of the present invention, a commodity resin film may be laminated and used between any of the substrate, the adhesive layer, and the coating layer to maintain the shaped form. Examples of the film to be laminated include, but not particularly limited to, polyethylene, polypropylene, and polyester, and the thickness is, for example, 1 to 100 µm.

EXAMPLES

Hereinbelow, the present invention is described more specifically with reference to Examples, but the present invention is not limited by the Examples. Also, in Examples and Comparative example, part(s) or % means part(s) by mass or % by mass, respectively, unless otherwise expressly noticed. It should be noted that the physical properties were evaluated according to the following methods.
(1) Production of Sample Films for Impact Resistance Evaluation An acrylic dispersion (solid content: 40%) as an aqueous anchor coat agent was applied to a corona-treated surface of a PVC film that had been subjected to a corona-discharge treatment (thickness: 250 μm) such that the amount coated was 2.0 g/m², dried, and subsequently, a vinylidene chloride copolymer latex to be evaluated was applied with a meyer rod and dried. The latex was applied, so as to achieve a weight of the coating after drying of 40 g/m² in the case of a monolayer coated film, and so as to achieve a weight of the coating after drying of 35 g/m² in the base coat portion and of 5 g/m² in the top coat portion in the case of bilayer coated film, as the standard conditions. The drying conditions were drying in a hot-air circulation dryer at 85° C. for 15 seconds. Impact resistance evaluation was carried out using this film.

(2) Production of Sample Films for Barrier Properties Evaluation

An acrylic dispersion (solid content: 40%) as an aqueous anchor coat agent was applied to a corona-treated surface of a PVC film that had been subjected to a corona-discharge treatment (thickness: 250 μm) such that the amount coated was 2.0 g/m², dried, and subsequently, a vinylidene chloride copolymer latex to be evaluated was applied with a meyer rod and dried. The latex was applied, so as to achieve a weight of the coating after drying of 40 g/m² in the case of a monolayer coated film, and so as to achieve a weight of the coating after drying of 35 g/m² in the base coat portion and of 5 g/m² in the top coat portion in the case of bilayer coated film, as the standard conditions. The drying conditions were drying in a hot-air circulation dryer at 85° C. for 15 seconds. The film after the drying was aged at 40° C. for 24 hours, cooled to room temperature, and then subjected to barrier properties (oxygen permeability and water vapor permeability) evaluation test.

(3) Measurement of Weight Average Molecular Weight, Mw, and Number Average Molecule Weight, Mn Molecular weight was determined using gel permeation chromatography under the following conditions from the calibration curve of the standard polystyrene.

(Column used): manufactured by TOSOH Corporation
TSKgel GMHXL
TSKgel G4000HXL
(Carrier): tetrahydrofuran (4) Evaluation of Average Particle Size The latex after the polymerization was diluted with pure water to 500 times and measured with FPAR-1000 (manufactured by Otsuka Electronics Co., Ltd.) as the measuring equipment.

(5) Evaluation of Surface Tension

Surface tension of the latex after the polymerization was measured with an automatic surface tensiometer CBVP-Z (manufactured by Kyowa Interface Science Co., Ltd.)

(6) Evaluation of Impact Resistance

Tensile impact strength was used as an evaluation indicator of impact resistance. Tensile impact strength was measured in accordance with JIS-K7160 using the following equipment.

DIGITAL IMPACT TESTER manufactured by Toyo Seiki Seisaku-sho, Ltd.

Ten or more specimens in a predetermined shape in which the part to be measured is 10 mm were prepared as samples, and an average value was calculated based on date of 10 or more measurements.

The sample films for impact resistance evaluation produced in the above-described (1) were stored immediately after the production at the temperature of 23° C. After one day, two days, one month, three months, and six months, the tensile impact strength was measured, and each data was evaluated as one day, two days, one month, three months, and six months after coating. As the evaluation criteria, films having the average tensile impact strength of 200 kJ/m² or more were evaluated to be excellent in impact resistance.

(7) Oxygen Permeability

For barrier properties evaluation, oxygen permeability of the film was measured. The coated films produced in the above-described (2) were subjected to sufficient moisture conditioning at room temperature and the relative humidity of 100%, and subsequently, their oxygen permeability was measured using OX-TRAN 100 (manufactured by Modern Control, Inc.) at 23° C. and the relative humidity of 80%.

(8) Water Vapor Permeability

For barrier properties evaluation, water vapor permeability of the films was measured. The coated films produced in the above-described (2) were subjected to sufficient moisture conditioning at room temperature and a relative humidity of 100%, and subsequently, their water vapor permeability was measured using PERMATRAN W3/31 (manufactured by Modern Control, Inc.) at 38° C. and the relative humidity of 100%.

(9) Heat Stability (Discoloration Resistance)

The coated films produced in the above-described (1) were heat-treated at 80° C. for four days. Then, the end surfaces of the coated films that were rolled and the coated films that were rolled and left under fluorescent lamps for 14 days were visually examined. The examination was carried out using three or more samples. The evaluation criteria were the following three grades, compared to samples that were neither heat-treated nor left under lamps.

○: Equivalent and not colored
Δ: Samples that turned yellow were observed.
x: All samples turned dark brown.

Example 1

A glass-lined pressure-resistant reactor was charged with 100 parts of ion-exchanged water, 0.2 parts of sodium dodecyl sulfonate, and 0.2 parts of sodium persulfate and degassed, and then, the temperature of the content was maintained at 50° C. In a separate vessel, 90 parts by mass of vinylidene chloride (VDC), 9.7 parts by mass of methyl acrylate (MA), and 0.3 parts by mass of acrylic acid (AA) were weighed and mixed to thereby produce a monomer mixture. Ten parts by mass of the monomer mixture was added to the reactor and reacted for about 10 hours. Then, 90 parts by mass of the remaining monomer mixture and 0.7 parts by mass of sodium dodecyl sulfonate were totally added over approximately 25 hours under such control that the inner temperature was not increased. Subsequently, after the reaction was allowed to proceed until the inner pressure was decreased to 0.1 MPa, the mixture was heated to 60° C. and the monomer residues were removed under reduced pressure to thereby provide a latex for the evaluation.

A monolayer coated film was produced using the vinylidene chloride copolymer latex thus obtained and subjected to the evaluation. It should be noted that the latex for the evaluation was submitted to coating evaluation immediately after polymerization (one week after polymerization) and to evaluation after storage at normal temperature (23° C.) for three month in order to clarify the effect from the difference of storage conditions. The results are shown in Table 1.

Example 2

A vinylidene chloride copolymer latex was produced in the same method as in Example 1, except that the time for adding 90 parts by mass of the remaining monomer mixture and 0.7 parts by mass of sodium dodecyl sulfonate during the polymerization in Example 1 was changed from 25 hours to 23 hours. A monolayer coated film was produced using this latex and subjected to the evaluation. The results are shown in Table 1.

Example 3

A vinylidene chloride copolymer latex was produced in the same method as in Example 1, except that the time for adding 90 parts by mass of the remaining monomer mixture and 0.7 parts by mass of sodium dodecyl sulfonate during the polymerization in Example 1 was changed from 25 hours to 20 hours. A monolayer coated film was produced using this latex and subjected to the evaluation. The results are shown in Table 1.

Example 4

A vinylidene chloride copolymer latex was produced in a same method as in Example 1, except that the time for adding 90 parts by mass of the remaining monomer mixture and 0.7 parts by mass of sodium dodecyl sulfonate during the polymerization in Example 1 was changed from 25 hours to 18 hours. A monolayer coated film was produced using this latex and subjected to the evaluation. The results are shown in Table 1.

Example 5

A vinylidene chloride copolymer latex was produced in the same method as in Example 1, except that the amounts of the VDC and MA of the monomer mixture to be weighed and mixed in a separate vessel were changed to 88 parts by mass and 11.7 parts by mass and that the time for adding 90 parts by mass of the remaining monomer mixture and 0.7 parts by mass of sodium dodecyl sulfonate during the polymerization in Example 1 was changed from 25 hours to 23 hours. A monolayer coated film was produced using this latex and subjected to the evaluation. The results are shown in Table 1.

Example 6

A vinylidene chloride copolymer latex was produced in a same method as in Example 1, except that the amounts of the VDC and MA of the monomer mixture to be weighed and mixed in a separate vessel were changed to 91.5 parts by mass and 8.2 parts by mass and that the time for adding 90 parts by mass of the remaining monomer mixture and 0.7 parts by mass of sodium dodecyl sulfonate during polymerization in Example 1 was changed from 25 hours to 22 hours. A monolayer coated film was produced using this latex and subjected to the evaluation. The results are shown in Table 1.

Example 7

A vinylidene chloride copolymer latex was produced in the same method as in Example 1, except that the amounts of the VDC and MA of the monomer mixture to be weighed and mixed in a separate vessel was changed to 92.2 parts by mass and 7.7 parts by mass and that the time for adding 90 parts by mass of the remaining monomer mixture and 0.7 parts by mass of sodium dodecyl sulfonate during the polymerization in Example 1 was changed from 25 hours to 23 hours. A monolayer coated film was produced using this latex and subjected to the evaluation. The results are shown in Table 1.

Comparative Example 1

A vinylidene chloride copolymer latex was produced in the same method as in Example 1, except that the time for adding 90 parts by mass of the remaining monomer mixture and 0.7 parts by mass of sodium dodecyl sulfonate during the polymerization in Example 1 was changed from 25 hours to 15 hours. A monolayer coated film was produced using this latex and subjected to the evaluation. The results are shown in Table 1.

Comparative Example 2

A vinylidene chloride copolymer latex was produced in the same method as in Example 1, except that the time for adding 90 parts by mass of the remaining monomer mixture and 0.7 parts by mass of sodium dodecyl sulfonate during polymerization in Example 1 was changed from 25 hours to 35 hours. A monolayer coated film was produced using this latex and subjected to the evaluation. The results are shown in Table 1.

Example 8

A vinylidene chloride copolymer latex was produced in a same method as in Example 1, except that the amount of sodium dodecyl sulfonate to be charged with ion-exchanged water in the pressure-resistant reactor was changed to 0.3 parts and that the time for adding 90 parts by mass of the remaining monomer mixture and 0.7 parts by mass of sodium dodecyl sulfonate during the polymerization in Example 1 was changed from 25 hours to 23 hours. A monolayer coated film was produced using this latex and subjected to the evaluation. The results are shown in Table 1.

Example 9

A vinylidene chloride copolymer latex was produced in the same method as in Example 1, except that the amount of sodium dodecyl sulfonate to be added with 90 parts by mass of the remaining monomer mixture during the polymerization in Example 1 was changed to 0.9 parts by mass and that the time for adding them was changed from 25 hours to 23 hours. A monolayer coated film was produced using this latex and subjected to the evaluation. The results are shown in Table 1.

Example 10

A monolayer coated film was produced by varying the amount of the vinylidene chloride copolymer latex in Example 5 to be applied for the evaluation from the standard if 40 g/m$^2$ to 80 g/m$^2$ and subjected to the evaluation. The results are shown in Table 1.

Example 11

A latex for application was obtained by adding 0.3 parts by mass of a polyethylene wax composition (Poligen (Registered Trade Mark) WE7, manufactured by BASF), based on 100 parts by mass of the vinylidene chloride copolymer in the latex, to a vinylidene chloride copolymer latex produced in the same method as in Example 6. Then, a monolayer coated film was produced and subjected to the evaluation. The results are shown in Table 1.

Application Example 1

A bilayer coated film was produced using the vinylidene chloride copolymer latex of Example 2 as the base coat portion and the vinylidene chloride copolymer latex of Example 11 as the top coat portion, and was subjected to the evaluation. The results are shown in Table 2.

Application Example 2

A bilayer coated film was produced using the vinylidene chloride copolymer latex of Example 2 as the base coat portion and the vinylidene chloride copolymer latex of Example 6 as the top coat portion, and was subjected to the evaluation. The results are shown in Table 2.

Application Example 3

A bilayer coated film was produced using the vinylidene chloride copolymer latex of Comparative Example 1 as the base coat portion and the vinylidene chloride copolymer latex of Example 11 as the top coat portion, and was subjected to the evaluation. The results are shown in Table 2.

(Analysis of Coating Layers in the Film)

The monomer composition and molecular weight of vinylidene chloride copolymers in coating layers applied to a substrate of the film and dried can be analyzed and measured, for example, according to the following techniques.

As methods for analyzing the monomer composition, measurement can be carried out by means of, for example, the ATR method (Attenuated Total Reflection method) for the surface or cross section of the coating layers with a Fourier transform infrared spectrometer (FT-IR), and a pyrolysis gas chromatograph/mass spectrometer (Py-GC/MS) using samples delaminated off from the coating layers, and it is preferable that samples to be measured be pretreated depending on the shape and physical properties and be submitted to analysis and measurement.

As the method for analyzing the molecular weight of the copolymer, gel permeation chromatography (GPC) measurement of the solution of the coating layer can be employed. Measurement can be carried out by dissolving, for example, samples collected from the coating layer or the surface of the coating layer in tetrahydrofuran as the solvent and collecting the samples.

The copolymer composition and molecular weight of the monolayer coated on the substrate in Example 1 were analyzed.

A sample was collected from a portion of the surface of the coating layer, and the monomer composition was analyzed and measured with a Py-GC/MS. As the result, 9.6% by weight of MA and 0.3% by weight of AA were detected, and the others were the peaks derived from vinylidene chloride. Also, a portion of the coating layer was dissolved in tetrahydrofuran and measured with GPC. As the result, the weight average molecular weight, Mw, was 149,000, the number average molecule weight, Mn, was 64,000, and Mw/Mn was 2.3. From these results, it was confirmed that the copolymer in the coating layer had a composition and molecular weights substantially the same as those of the copolymer in the latex used for the application of the coating layer.

TABLE 1

Result of evaluation of monolayer coatings

|  | (Unit) | Example 1 | Example 2 | Example 3 | Example 4 | Example 5 | Example 6 | Example 7 |
|---|---|---|---|---|---|---|---|---|
| VDC | Parts by Mass | 90.0 | 90.0 | 90.0 | 90.0 | 88.0 | 91.5 | 92.2 |
| MA | Parts by Mass | 9.7 | 9.7 | 9.7 | 9.7 | 11.7 | 8.2 | 7.7 |
| AA | Parts by Mass | 0.3 | 0.3 | 0.3 | 0.3 | 0.3 | 0.3 | 0.3 |
| Wax | Parts by Mass | 0.0 | 0.0 | 0.0 | 0.0 | 0.0 | 0.0 | 0.0 |
| Mw | $10^4$ | 14.8 | 17.3 | 19.9 | 25.2 | 18.5 | 18.9 | 17.8 |
| Mn | $10^4$ | 6.3 | 7.2 | 7.5 | 8.5 | 7.2 | 7.5 | 7.4 |
| Mw/Mn |  | 2.3 | 2.4 | 2.7 | 3.0 | 2.6 | 2.5 | 2.4 |
| Average Particle Size of Copolymer in Latex | nm | 161 | 153 | 139 | 132 | 154 | 151 | 155 |
| Surface Tension of Latex | mN/m | 49.9 | 48.1 | 45.5 | 43.2 | 47.9 | 47.1 | 48.2 |
| Amount of Dried Coating Applied | g/m$^2$ | 40 | 40 | 40 | 40 | 40 | 40 | 40 |
| Latex, One Week After Polymerization |  |  |  |  |  |  |  |  |
| Impact Resistance, 1 Day After Coating | kJ/m$^2$ | 420 | 380 | 190 | 110 | 170 | 350 | 390 |
| Impact Resistance, 2 Days After Coating | kJ/m$^2$ | 500 | 460 | 390 | 190 | 220 | 430 | 470 |
| Impact Resistance, 1 Month After Coating | kJ/m$^2$ | 450 | 420 | 400 | 380 | 250 | 350 | 150 |
| Impact Resistance, 3 Months After Coating | kJ/m$^2$ | 390 | 360 | 330 | 340 | 170 | 260 | 110 |
| Impact Resistance, 6 Months After Coating | kJ/m$^2$ | 250 | 230 | 190 | 160 | 50 | 210 | 50 |
| Latex, after 3 months storage at normal temperature |  |  |  |  |  |  |  |  |
| Impact Resistance, 1 Day After Coating | kJ/m$^2$ | 410 | 400 | 100 | 90 | 150 | 380 | 350 |
| Impact Resistance, 2 Days After Coating | kJ/m$^2$ | 450 | 420 | 320 | 150 | 200 | 430 | 450 |
| Impact Resistance, 1 Month After Coating | kJ/m$^2$ | 410 | 400 | 380 | 350 | 220 | 300 | 60 |
| Impact Resistance, 3 Months After Coating | kJ/m$^2$ | 350 | 290 | 270 | 240 | 150 | 220 | 50 |
| Impact Resistance, 6 Months After Coating | kJ/m$^2$ | 220 | 210 | 120 | 90 | 60 | 200 | 50 |
| Barrier Properties (Latex, One Week after Polymerization) |  |  |  |  |  |  |  |  |
| Oxygen Permeability at 23° C., 0.1 MPa | cc/m$^2$ · day | 0.94 | 1.04 | 1.14 | 1.19 | 2.02 | 0.89 | 0.69 |
| Water Vapor Permeability at 38° C., 100% RH | g/m$^2$ · day | 0.88 | 0.96 | 1.04 | 1.08 | 2.14 | 0.81 | 0.64 |
| Heat Stability (Discoloration Resistance) |  | ○ | ○ | ○ | ○ | ○ | ○ | Δ |

TABLE 1-continued

Result of evaluation of monolayer coatings

| | (Unit) | Comparative Example 1 | Comparative Example 2 | Example 8 | Example 9 | Example 10 | Example 11 |
|---|---|---|---|---|---|---|---|
| VDC | Parts by Mass | 90.0 | 90.0 | 90.0 | 90.0 | 88.0 | 91.5 |
| MA | Parts by Mass | 9.7 | 9.7 | 9.7 | 9.7 | 11.7 | 8.2 |
| AA | Parts by Mass | 0.3 | 0.3 | 0.3 | 0.3 | 0.3 | 0.3 |
| Wax | Parts by Mass | 0.0 | 0.0 | 0.0 | 0.0 | 0.0 | 0.3 |
| Mw | $10^4$ | 32.5 | 9.1 | 17.3 | 17.3 | 18.5 | 18.9 |
| Mn | $10^4$ | 10.5 | 4.8 | 7.2 | 7.2 | 7.2 | 7.5 |
| Mw/Mn | | 3.1 | 1.9 | 2.4 | 2.4 | 2.6 | 2.5 |
| Average Particle Size of Copolymer in Latex | nm | 122 | 191 | 129 | 154 | 154 | 151 |
| Surface Tension of Latex | mN/m | 41.3 | 57.1 | 47.0 | 42.1 | 47.9 | 47.1 |
| Amount of Dried Coating Applied | g/m$^2$ | 40 | 40 | 40 | 40 | 80 | 40 |
| Latex, One Week After Polymerization | | | | | | | |
| Impact Resistance, 1 Day After Coating | kJ/m$^2$ | 90 | 390 | 250 | 210 | 170 | 490 |
| Impact Resistance, 2 Days After Coating | kJ/m$^2$ | 110 | 460 | 310 | 300 | 230 | 510 |
| Impact Resistance, 1 Month After Coating | kJ/m$^2$ | 350 | 430 | 310 | 340 | 240 | 210 |
| Impact Resistance, 3 Months After Coating | kJ/m$^2$ | 300 | 350 | 240 | 290 | 160 | 90 |
| Impact Resistance, 6 Months After Coating | kJ/m$^2$ | 120 | 220 | 140 | 170 | 60 | 90 |
| Latex, after 3 months storage at normal temperature | | | | | | | |
| Impact Resistance, 1 Day After Coating | kJ/m$^2$ | 60 | 400 | 240 | 190 | 160 | 480 |
| Impact Resistance, 2 Days After Coating | kJ/m$^2$ | 90 | 410 | 320 | 310 | 210 | 500 |
| Impact Resistance, 1 Month After Coating | kJ/m$^2$ | 290 | 390 | 250 | 290 | 230 | 180 |
| Impact Resistance, 3 Months After Coating | kJ/m$^2$ | 190 | 250 | 200 | 220 | 140 | 90 |
| Impact Resistance, 6 Months After Coating | kJ/m$^2$ | 100 | 180 | 130 | 150 | 60 | 80 |
| Barrier Properties (Latex, One Week after Polymerization) | | | | | | | |
| Oxygen Permeability at 23° C., 0.1 MPa | cc/m$^2$ · day | 1.44 | 0.98 | 1.18 | 1.13 | 1.09 | 0.74 |
| Water Vapor Permeability at 38° C., 100% RH | g/m$^2$ · day | 1.40 | 0.94 | 1.12 | 1.06 | 1.14 | 0.68 |
| Heat Stability (Discoloration Resistance) | | ◯ | X | ◯ | ◯ | ◯ | ◯ |

TABLE 2

Result of evaluation of bilayer coatings

| | (Unit) | Application Example 1 | Application Example 2 | Application Example 3 |
|---|---|---|---|---|
| Base Coat Portion | | | | |
| VDC | Parts by Mass | 90.0 | 90.0 | 90.0 |
| MA | Parts by Mass | 9.7 | 9.7 | 9.7 |
| AA | Parts by Mass | 0.3 | 0.3 | 0.3 |
| Wax | Parts by Mass | 0.0 | 0.0 | 0.0 |
| Mw | $10^4$ | 17.3 | 17.3 | 32.5 |
| Mn | $10^4$ | 7.2 | 7.2 | 10.5 |
| Mw/Mn | | 2.4 | 2.4 | 3.1 |
| Amount of Dried Coating Applied | g/m$^2$ | 35 | 35 | 35 |
| Top Coat Portion | | | | |
| VDC | Parts by Mass | 91.5 | 91.5 | 91.5 |
| MA | Parts by Mass | 8.2 | 8.2 | 8.2 |
| AA | Parts by Mass | 0.3 | 0.3 | 0.3 |
| Wax | Parts by Mass | 0.3 | 0.0 | 0.3 |
| Mw | $10^4$ | 18.9 | 18.9 | 18.9 |
| Mn | $10^4$ | 7.5 | 7.5 | 7.5 |
| Mw/Mn | | 2.5 | 2.5 | 2.5 |
| Amount of Dried Coating Applied | g/m$^2$ | 5 | 5 | 5 |
| Latex, One Week After Polymerization | | | | |
| Impact Resistance, 1 Day After Coating | kJ/m$^2$ | 300 | 240 | 140 |
| Impact Resistance, 2 Days After Coating | kJ/m$^2$ | 450 | 330 | 160 |
| Impact Resistance, 1 Month After Coating | kJ/m$^2$ | 400 | 420 | 290 |
| Impact Resistance, 3 Months After Coating | kJ/m$^2$ | 320 | 350 | 200 |
| Impact Resistance, 6 Months After Coating | kJ/m$^2$ | 210 | 220 | 120 |
| Latex, after 3 months storage at normal temperature | | | | |
| Impact Resistance, 1 Day After Coating | kJ/m$^2$ | 360 | 230 | 120 |
| Impact Resistance, 2 Days After Coating | kJ/m$^2$ | 390 | 300 | 150 |
| Impact Resistance, 1 Month After Coating | kJ/m$^2$ | 350 | 390 | 280 |
| Impact Resistance, 3 Months After Coating | kJ/m$^2$ | 290 | 300 | 180 |
| Impact Resistance, 6 Months After Coating | kJ/m$^2$ | 170 | 200 | 100 |

TABLE 2-continued

Result of evaluation of bilayer coatings

| | (Unit) | Application Example 1 | Application Example 2 | Application Example 3 |
|---|---|---|---|---|
| Barrier Properties (Latex, One Week after Polymerization) | | | | |
| Oxygen Permeability at 23° C., 0.1 MPa | cc/m² · day | 0.84 | 0.98 | 1.32 |
| Water Vapor Permeability at 38° C., 100% RH | g/m² · day | 0.79 | 0.91 | 1.29 |
| Heat Stability (Discoloration Resistance) | | ○ | ○ | ○ |

INDUSTRIAL APPLICABILITY

The film coated with the vinylidene chloride copolymer latex of the present invention exhibits a high impact resistance immediately after the coating over a long period, and furthermore, has excellent barrier properties and heat stability. As a result, the present invention can provide a film for blister packs that exerts high barrier properties immediately after the use over a long period, and thus has a high applicability in various industrial fields.

The invention claimed is:

1. A latex comprising a vinylidene chloride copolymer obtainable by emulsion polymerizing 70 to 95 parts by mass of vinylidene chloride with 30 to 5 parts by mass of one or more other monomer(s) copolymerizable with vinylidene chloride, with the proviso that the total of vinylidene chloride and the other monomer(s) is 100 parts by mass, characterized in that the weight average molecular weight, Mw, of the copolymer is from 120,000 to 300,000;
   wherein the copolymer is particulate, and the average particle size thereof is from 140 to 190 nm.

2. The latex according to claim 1, wherein the latex has a surface tension of from 45 to 55 mN/m.

3. The latex according to claim 1, wherein the copolymer is a vinylidene chloride copolymer obtainable by emulsion polymerizing 89 to 92 parts by mass of vinylidene chloride with 11 to 8 parts by mass of one or more other monomer(s) copolymerizable with vinylidene chloride.

4. The latex according to claim 1, wherein the weight average molecular weight, Mw, of the copolymer is from 120,000 to 190,000.

5. A film for blister packs comprising a substrate and a coating layer,
   wherein the coating layer comprises a vinylidene chloride copolymer comprising 70 to 95 parts by mass of constituent units derived from vinylidene chloride and 30 to 5 parts by mass of constituent units derived from one or more other monomer(s) copolymerizable with vinylidene chloride, with the proviso that the total of the constituent units derived from vinylidene chloride and the constituent units derived from the other monomer(s) is 100 parts by mass, and having a weight average molecular weight, Mw, of from 120,000 to 300,000;
   wherein the coating layer is obtained from a latex comprising vinylidene chloride copolymer particles having an average particle size of from 140 to 190 nm.

6. The film for blister packs according to claim 5, wherein the copolymer is a vinylidene chloride copolymer comprising 89 to 92 parts by mass of the constitutent units derived from vinylidene chloride and 11 to 8 parts by mass of the constituent units derived from one or more other monomer(s) copolymerizable with vinylidene chloride.

7. The film for blister packs according to claim 5, wherein the weight average molecular weight, Mw, of the copolymer is from 120,000 to 190,000.

8. The film for blister packs according to claim 5 having a tensile impact strength of 200 kJ/m² or more.

9. The film for blister packs according to claim 5, wherein the coating layer comprises from 0.01 to 1 part by mass of a wax based on 100 parts by mass of the copolymer.

10. The film for blister packs according to claim 5, wherein the coating layer comprises a plurality of layers and one or more of the plurality of layers is/are layer(s) comprising no wax.

11. The film for blister packs according to claim 10, wherein the outermost layer of the plurality of layers comprises from 0.01 to 1 part by mass of a wax.

12. The latex according to claim 1, characterized in that the latex is used in a film for blister packs.

13. The latex according to claim 2, wherein the copolymer is a vinylidene chloride copolymer obtainable by emulsion polymerizing 89 to 92 parts by mass of vinylidene chloride with 11 to 8 parts by mass of one or more other monomer(s) copolymerizable with vinylidene chloride.

14. The latex according to claim 2, wherein the weight average molecular weight, Mw, of the copolymer is from 120,000 to 190,000.

15. The latex according to claim 4, wherein the weight average molecular weight, Mw, of the copolymer is from 120,000 to 190,000.

16. The film for blister packs according to claim 6, wherein the weight average molecular weight, Mw, of the copolymer is from 120,000 to 190,000.

17. The film for blister packs according to claim 5, wherein the latex has a surface tension of from 45 to 55 mN/m.

* * * * *